United States Patent

[11] 3,578,184

| | | |
|---|---|---|
| [72] | Inventor | Wilbur A. Schaich<br>Maumee, Ohio |
| [21] | Appl. No. | 808,887 |
| [22] | Filed | Mar. 20, 1969 |
| [45] | Patented | May 11, 1971 |
| [73] | Assignee | Owens-Illinois, Inc. |

[54] ARTICLE HANDLING METHOD AND APPARATUS
8 Claims, 6 Drawing Figs.

[52] U.S. Cl. .................................................. 214/38,
214/152, 214/310
[51] Int. Cl. .................................................. B65g 67/02
[50] Field of Search .......................................... 214/38.46,
38.8, 84, 310, 38.42, 152

[56] References Cited
UNITED STATES PATENTS

| | | | |
|---|---|---|---|
| 2,096,958 | 10/1937 | Clerc | (214/38.8)UX |
| 2,639,050 | 5/1953 | Hoffman | 214/38(.46)X |
| 2,693,286 | 11/1954 | Cocks | 214/84 |
| 2,825,600 | 3/1958 | Macomber | 214/38(.46)X |
| 3,040,914 | 6/1962 | Johnson et al. | 214/310 |

*Primary Examiner*—Robert G. Sheridan
*Attorneys*—John R. Nelson and Edward J. Holler ABSTRACT: Methods and apparatus for transporting and handling relatively large articles of uniform size, as for example, loaded pallets. A boxlike unit load container, of a size corresponding generally to that of the cargo portion of a conventional semitrailer, is constructed with an open framed gridlike bottom having openings of lesser dimensions than those of the bottoms of the individual articles or pallets so as to support the articles with a major portion of the bottom surface of the article overlying and exposed through one or more of the openings in the container bottom. A shipping or receiving dock platform is provided with a conveyor system with a terminal group of conveying elements arranged in a pattern corresponding to that of the openings in the unit load container bottom so that the conveying elements can project or be projected upwardly through the openings in the container bottom to an elevation above the article supporting surface of the bottom when the container is at rest on the dock platform. The conveying elements thus enable the articles or loaded pallets to be conveyed into or out of the unit load container. The container is provided with means for detachably securing it onto the bed of a trailer frame for over-the-road transport and the securing means can also be employed to secure the container to a lifting sling.

Patented May 11, 1971

INVENTOR.
WILBUR A. SCHAICH.
BY
J. R. Nelson and
E. J. Haller
ATT'Y.

INVENTOR.
WILBUR A. SCHAICH.

ARTICLE HANDLING METHOD AND APPARATUS

BACKGROUND OF THE INVENTION

While the present invention obviously has application in many other environments, it was specifically designed for distributing bottles from the bottle making plant to individual bottlers. For this purpose, a satisfactory distribution system must take into account the following factors. First, the system must be capable of handling bottles in large quantities, preferably by truck. Second, the system should conveniently provide for storage of a backlog supply at the bottling plant to provide flexibility in delivery schedules and fluctuations in demand. Adaptability for storage is also important to the bottle producer, since production can be halted only by the major operation of shutting down the glass furnace. Manual handling must be minimized.

In the system of the present invention, the storage and transportation problems are minimized by the employment of a unit load container whose dimensions are generally those of the cargo containing portion of a conventional semitrailer. The unit load container is, in itself, a satisfactory storage facility, eliminating the need for a storage warehouse. The unit load container can be loaded as a unit onto or off of a trailer bed or frame for over-the-road transport. In view of the fact that the weight to volume ratio of glass containers or bottles is relatively low, the unit load containers may be of relatively lightweight construction.

The unit load containers are constructed with a bottom which consists of an open grid of longitudinal and transversely extending frame members. The openings in the gridlike bottom are of dimensions slightly smaller than the dimensions of the bottoms of the pallets or articles which are to be transported, so that a group of articles may be supported within the unit load container with a major portion of their bottom surfaces exposed through the openings in the gridlike frame.

The shipping docks at both the shipping plant and the receiving plant are constructed with a conveyor system whose terminus consists of groups of conveying elements arranged in a pattern matching the openings in the container bottom. This permits the container to be lowered onto the shipping platform with the conveying elements clearing the frame members of the bottom and projecting upwardly into the opening between the frame members. The conveying elements preferably take the form of conveying rollers, the upper surfaces of which project upwardly through the openings above the article supporting surface of the container bottom when the container rests upon the shipping platform so that the articles within the container are thus elevated by the conveying rollers clear of the container bottom. The conveying elements may either be power driven or may be mounted upon a slight incline to provide a gravity roller conveyor to convey the loaded pallets or articles into or out of the container, depending upon whether they are located at the shipping or receiving plant.

The frame of the unit load conveyor is preferably constructed with a series of external eye bolts which provide a convenient means for either detachably securing the container to the truck trailer bed or providing a purchase for the hooks of a lifting sling for local transport of the container.

Other objects and features of the invention will become apparent by reference to the following specification and to the drawings.

Figure 1:
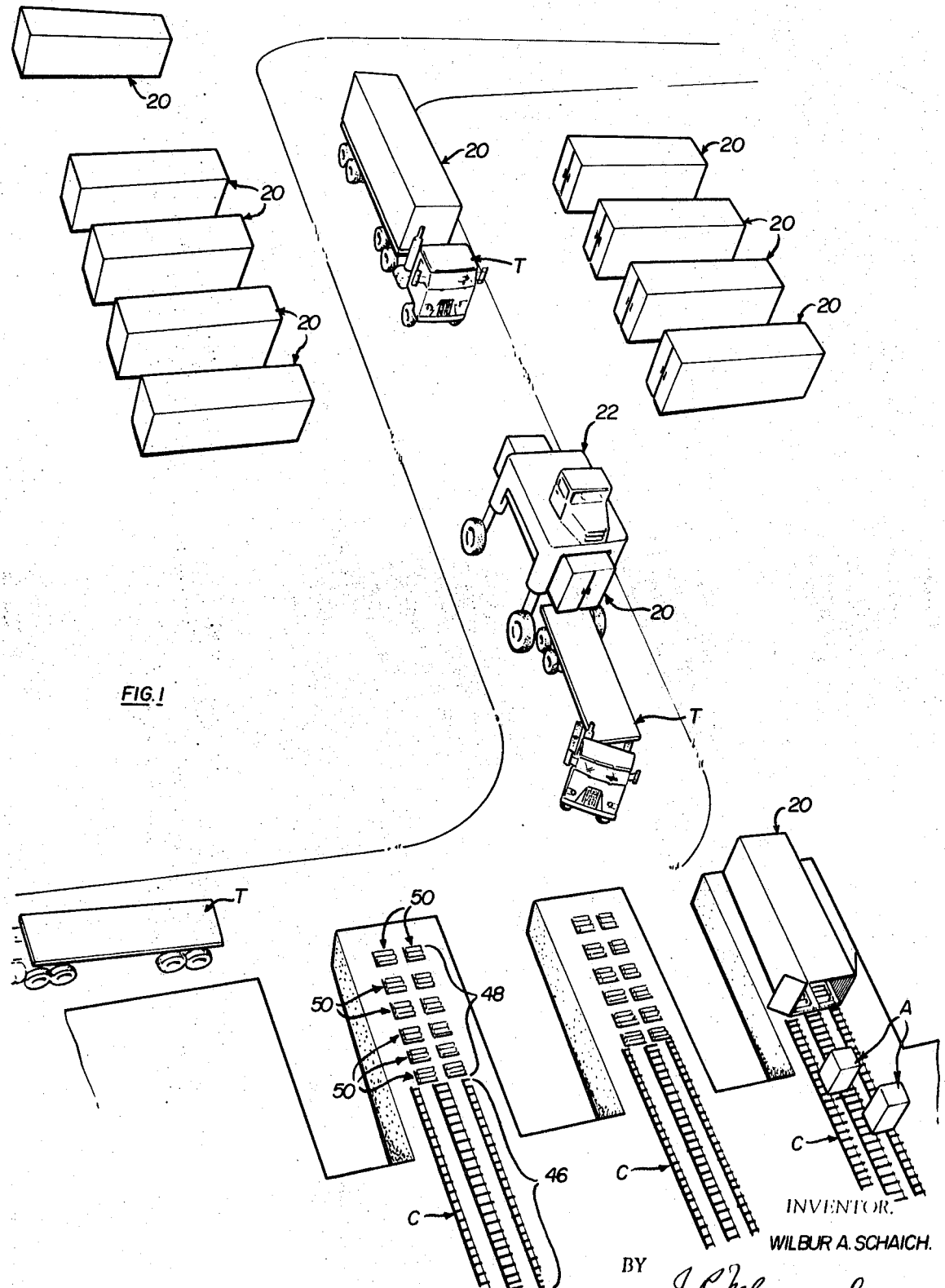
FIG. 1 is a perspective view of a shipping or receiving dock area illustrating the present invention in use.

Referring first to FIG. 1, the purpose of the present invention is that of handling, transporting and storing relatively large, bulky articles of uniform size. The invention is specifically described below in terms of handling and supplying empty containers or bottles to a bottling plant although its application is obviously not so limited. The bottles are packages for shipment at the bottle making plant upon conventional wooden pallets, for ease in in-plant handling by forklift trucks, and the resultant package or article may for example have overall dimensions of roughly 4 by 4 by 8 feet, in one instance or, in some cases the assembled package may be substantially cubical in shape with an approximate 8-foot dimension on each side.

In FIG. 1, two of the smaller size packages appear in the lower right-hand corner of the figure and are designated generally A. In FIG. 1, the articles A are shown being discharged along a conveyor line designated generally C from a unit load container designated generally 20, whose construction will be described in greater detail below.

As is apparent from FIG. 1, the size of the individual unit load containers 20 corresponds to that of the cargo portion of a conventional semitrailer truck, and in fact the unit load containers 20 are so constructed that they may be carried upon a flat bed semitrailer-tractor rig designated generally T for over-the-road transport between the container manufacturing plant and the bottling plant.

To generally outline the operation of the system, assembled articles such as A are packaged and transported from the interior of the container manufacturing plant to the loading dock and loaded into individual unit load containers 20 by a conveyor system C. The fully loaded unit load container is then transported from the loading dock and placed upon the trailer bed as by a straddle-type load transporter designated generally 22. The unit load container 20 is detachably secured in position upon the flat bed semitrailer and transported over the road to the bottling plant. At the bottling plant, the foregoing process is reversed—that is the container 20 is transferred from the tractor-trailer T onto the receiving dock, at which a conveying system C, in a manner to be described in detail below, unloads the individual articles A from the unit load container and conveys the articles into the interior of the bottling plant.

As implied from FIG. 1, the unit load container 20 can be employed as a storage facility. In a supply system of this type, adaptability of the system for storage purposes is essential both at the container manufacturing plant which, where glass containers are involved, must operate on a 24 hour per day production schedule, and at the bottling plant, where an adequate backlog supply of containers is required at all times. The unit load container of the present invention provides a weatherproof storage facility so that with the present system, warehousing is not required since the containers can be stored in the open and provide adequate protection for the contents.

Figure 2:
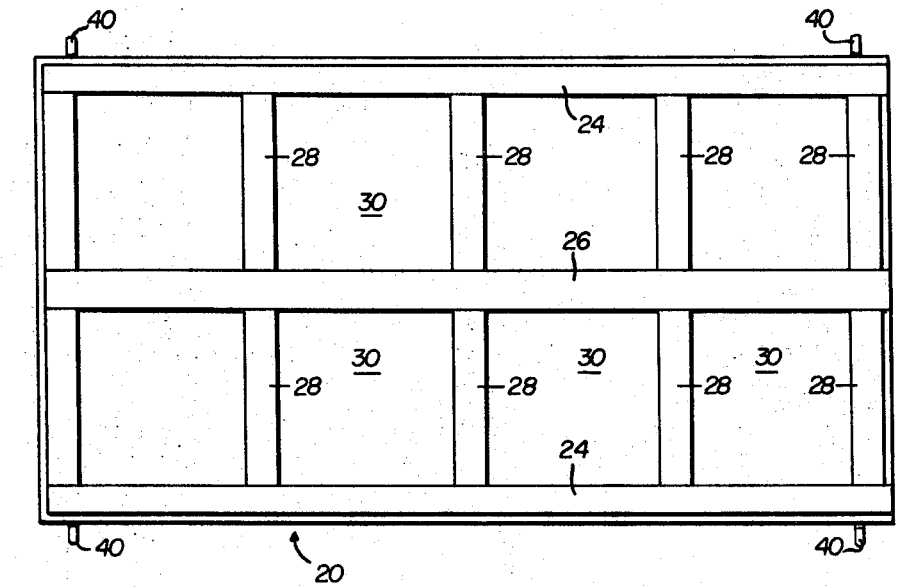
FIG. 2 is a bottom elevational view of a unit load container according to the present invention.
Figure 3:
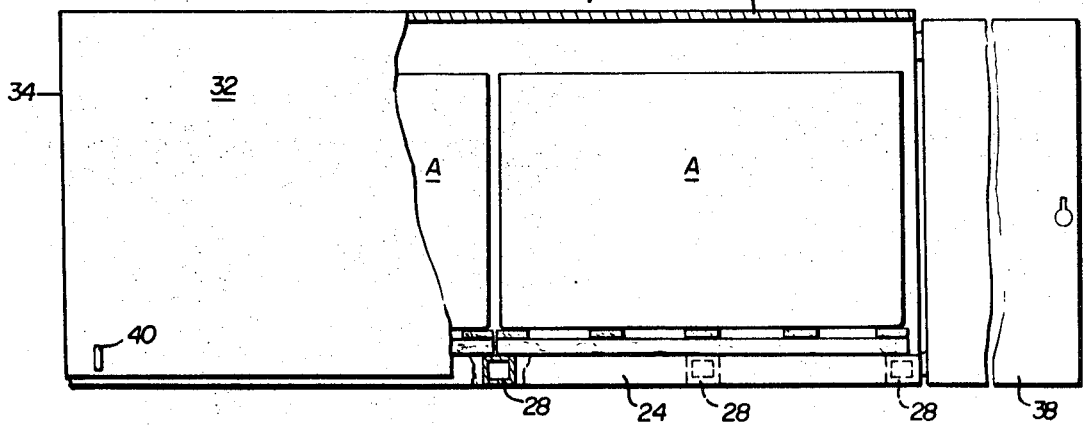
FIG. 3 is a side elevational view of the unit load container of FIG. 2, partially broken away and partially in cross section.
Figure 4:
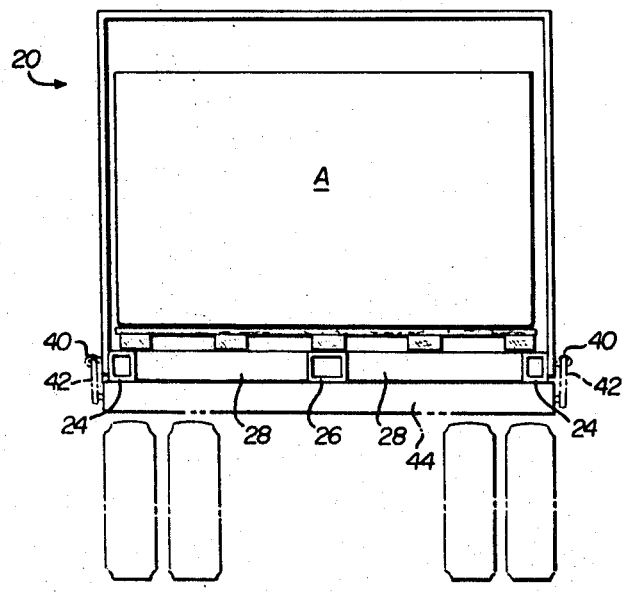
FIG. 4 is a cross-sectional view of the container of FIG. 3, including a broken line showing of a trailer indicating the manner of mounting the container on a trailer for over-the-road transport.

Referring now particularly to FIGS. 2, 3 and 4, the unit load containers 20 are constructed with a bottom made up of an open gridlike framework of structural steel members which include longitudinal side frame members 24 and a longitudinally extending center frame member 26, between which are fixedly secured, as by welding, transversely extending frame members 28. The width of frame members 24, 26 and 28 and the spacing between the members are chosen to be such that the rectangular openings 30 in the completed gridlike framework are of smaller overall dimensions than the corresponding dimensions of the bottom of articles to be supported or carried in the unit load container. The framework thus provides an adequate support for the articles, but leaves the major portion of the bottom surface of the articles exposed through openings 30.

With the exception of its bottom, the remainder of the unit load container 20 is constructed in accordance with standard designs and techniques employed in constructing conventional truck trailers; the sidewalls 32, front wall 34 and top being of conventional frame and panel construction and the rear wall being defined in the usual manner by a pair of doors 38 of conventional construction which permit the rear wall to be completely opened for loading and unloading of articles into and out of the container. The dimensions of the articles and that of the unit load container 20 are of course related to each other—for example the typical unit load container may be dimensioned to receive either eight of the 4 by 4 by 8 articles in two rows of four or alternatively to hold two of the 8 by 8 by 8 cubical articles in a single row. The interior height of the unit load container is designed to provide a vertical clearance, as for example, 6 inches or so above the top of articles supported upon the bottom frame members, because during loading and unloading the articles are elevated slightly above the supporting surface of the container bottom.

For use in securing the unit load container in position upon the trailer bed or to provide a purchase for hooks of the lifting slings of the load transporter, a suitable number of large eye bolts 40 are fixedly secured to the bottom side frame members 24 at appropriate locations. Turn buckle-type hooks such as 42 secured to the bed 44 of the trailer may be employed to detachably secure the unit load container 20 in fixed position on the trailer bed.

Figure 5:
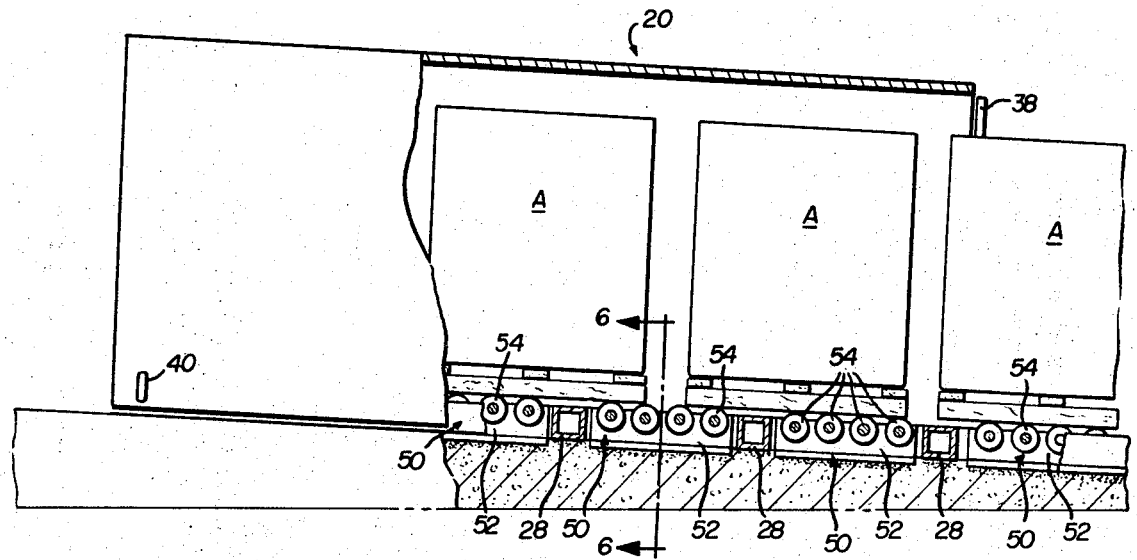
FIG. 5 is a side elevational view, partially in section, showing a unit load container of the type shown in FIG. 2 on an unloading dock during the unloading process.
Figure 6:
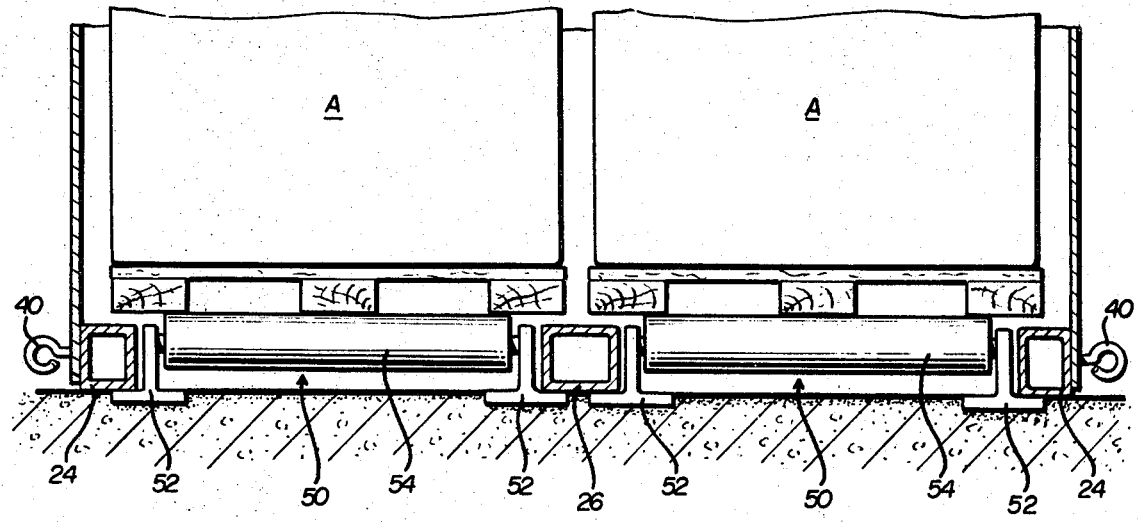
FIG. 6 is a detail cross-sectional view taken approximately on line 6–6 of FIG. 5.

Referring now particularly to FIGS. 1, 5 and 6, the conveyor C by means of which the articles A are moved into or out of the unit load container 20 is seen to consist of two sections—namely a main section bracketed in FIG. 1 by the numeral 46 and a terminal section bracketed in FIG. 1 by the numeral 48. The type of conveyor C employed may take any of several alternative forms. The specific type of conveyor herein disclosed is a gravity roller conveyor permanently mounted in the receiving dock floor, however, it is believed readily apparent that instead of a gravity conveyor, powered conveyors could be used or combinations of power driven and gravity conveyors, as for example a gravity conveyor at the terminal section 48 combined with a power driven main conveyor section 46.

As best seen in FIG. 1, the terminal section 48 of conveyor C is divided into a group of individual conveyor sections 50 which are spaced from each other in a pattern corresponding to that of the openings 30 in the bottom of unit load container 20. As best seen in FIGS. 5 and 6, each of the individual conveying sections 50 consists of a pair of spaced side frame members 52, between which are rotatably supported a plurality of conveying rollers 54 of the conventional construction. In the embodiment disclosed, the frame members 52 are embedded or otherwise permanently affixed in position in the dock floor with the supporting surface defined by the top of the rollers 54 being spaced above the dock floor by a height greater than the height or vertical thickness of the frame members 24, 26 and 28 of the unit load container bottom. The spacing between the individual terminal conveyor sections 50 enables the unit load container to be rested on the dock floor with the rollers 54 of the individual sections 50 projecting up through openings 30 in the unit load container to support articles within the unit load container clear of the bottom of the container.

The arrangement as shown in FIG. 5 is for a receiving dock installation—that is the direction of an inclination of the gravity conveyor is downwardly toward the rear of unit load container 20 to convey the articles out of container 20 when the container is placed in position upon the dock in overlying relationship to the terminal conveying sections constituted by the individual sections 50. It will, of course, be appreciated that the direction of inclination of the gravity conveyor would be reversed relative to the container for loading purposes.

The conveying system as disclosed in FIGS. 5 and 6 is but one example of several types of systems which could be employed. For example, instead of being permanently affixed to the shipping dock floor, the roller supporting frames 52 may be mounted upon hydraulic jacks so as to be retractable below floor level to permit cover plates to close them and make dock available for conventional purposes. In the event a single plant were to employ the system both for shipping and receiving, a reversible power driven conveying system would undoubtedly be preferably to a gravity system of the type disclosed.

Thus, while a specific embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. The method of handling and transporting articles comprising the steps of conveying a plurality of articles into the interior of a boxlike unit load container positioned at a loading station, arranging the articles side by side within the container upon an open gridlike frame constituting the bottom of the container with each article spanning at least one of the openings in the gridlike frame, transporting the container with the articles therein from the loading station to a delivery station, lowering the container at said delivery station onto a conveying means having conveying elements arranged to project upwardly through the openings in said frame to transfer the support of the articles from said frame to said conveying means while retaining the articles in their original side by side arrangement within said container, and conveying the articles from said container on said conveying means.

2. A method defined in claim 1 wherein the step of arranging the articles within the container comprises the steps of supporting the articles within the container in spaced relationship above the gridlike frame upon a conveying means while arranging the articles within the container, and lifting the container clear of the conveying means after the articles have been arranged within the container to transfer support of the articles from the conveying means to the gridlike frame constituting the bottom of the container.

3. The method as defined in claim 1 wherein the step of transferring the support of the articles at said delivery station comprises the steps of supporting the loaded container in a position wherein the openings in the gridlike frame of the container bottom are each vertically aligned with a group of conveying elements, and further lowering the container relative to the conveying elements while maintaining the aforementioned vertical alignments until the conveying elements project upwardly through the openings in the frame to lift the articles clear of the frame.

4. In a method for handling and transporting articles, the steps of locating a unit load container having a plurality of openings through its bottom upon a platform having a plurality of conveying means thereon arranged to project upwardly through the openings of the container bottom to define a conveying surface spaced above the container bottom, conveying a plurality of articles into said container upon said conveying surface arranging the articles upon said conveying surface so that each article overlies at least one opening in the container bottom, and elevating the container relative to said conveying surface to transfer support of the arranged articles from said conveying surface to the container bottom.

5. In a method of handling and transporting articles, the steps of loading a plurality of articles into a unit load container having an open rectangular bottom traversed by longitudinally and transversely extending frame members spaced from each other by distances less than the width of an article with the articles arranged within the container so that each article spans at least one of the openings in the framework, transporting the loaded container to a receiving platform having a plurality of groups of conveying means arranged in a pattern corresponding to the openings between the frame members of the container bottom and spaced from each other to accommodate vertical movement of the frame members therebetween, lowering the loaded container relative to said groups of conveying means until support of the articles within said container is transferred from said frame members to said conveying means, and conveying the articles from said container on said conveying means.

6. An article handling system for transporting articles to and from a stationary dock platform comprising a transportable boxlike unit load container adapted to contain a plurality of said articles and having door means accommodating movement of said articles into and out of said container, the bottom of said container being defined by a gridlike open framework of longitudinally and transversely extending frame members arranged to define rectangular openings in said bottom having at least one dimension less than that of the corresponding dimension of the bottom of one of said articles whereby said plurality of articles may be supported on said framework with a substantial portion of the bottom surface of each article overlying an opening, conveying means on said dock platform having a terminal section defined by a plurality of groups of conveying elements disposed on said platform in a pattern corresponding to the pattern of the openings in said gridlike framework and spaced from each other to accommodate vertical movement of said gridlike framework into the spaces between said groups of conveying elements, and support means on said platform adjacent said groups of conveying elements for supporting said unit load container at an elevation relative to said conveying elements such that the conveying elements project upwardly through said openings in said gridlike frame to support articles within said container in spaced relationship above said gridlike frame.

7. An article handling system as defined in claim 6 wherein said door means constitute one vertical sidewall of said container, said conveying elements comprising conveying rollers mounted for rotation about axes extending parallel to said one of said vertical sidewalls when said container is supported upon said support means.

8. An article handling system for transporting articles to and from a stationary dock platform comprising a boxlike unit load container adapted to contain a plurality of said articles, the bottom of said container being defined by a gridlike open framework of longitudinally and transversely extending frame members arranged to define rectangular openings in said bottom having at least one dimension less than that of the corresponding dimension of the bottom of one of said articles whereby said plurality of articles may be supported on said framework with a substantial portion of the bottom surface of each article overlying an opening, conveying means on said platform disposed in a pattern corresponding to the pattern of the openings in said gridlike framework, and support means on said platform adjacent said conveying means for supporting said unit load container at an elevation relative to said conveying means such that the conveying means project upwardly through said openings in said gridlike frame to support articles within said container in spaced relationship above said gridlike frame.